United States Patent [19]

Seki et al.

[11] Patent Number: 5,072,398
[45] Date of Patent: Dec. 10, 1991

[54] FIGURE DEFINITION METHOD IN AUTOMATIC PROGRAMMING

[75] Inventors: Masaki Seki; Takashi Takegahara, both of Tokyo; Masatoshi Nakajima, Yamanashi, all of Japan

[73] Assignee: Fanuc, Ltd., Minamitsuru, Japan

[21] Appl. No.: 392,923

[22] PCT Filed: Nov. 25, 1988

[86] PCT No.: PCT/JP88/01193
  § 371 Date: Aug. 1, 1989
  § 102(e) Date: Aug. 1, 1989

[87] PCT Pub. No.: WO89/05485
  PCT Pub. Date: Jun. 15, 1989

[30] Foreign Application Priority Data
  Dec. 9, 1987 [JP] Japan .................. 62-311709

[51] Int. Cl.[5] .............. G06F 15/46; G05B 19/18
[52] U.S. Cl. .................. 364/474.25; 364/191; 364/474.23; 364/474.27
[58] Field of Search ............ 364/474.25, 474.26, 364/474.27, 474.22, 474.23, 191-193, 188, 189; 318/568.1

[56] References Cited

U.S. PATENT DOCUMENTS

| | | | |
|---|---|---|---|
| 4,490,781 | 12/1984 | Kishi et al. | 364/474.25 X |
| 4,521,860 | 6/1985 | Kanematsu et al. | 364/474.26 |
| 4,530,046 | 7/1985 | Munekata et al. | 364/474.25 X |
| 4,660,148 | 4/1987 | Kishi et al. | 364/474.25 X |
| 4,723,203 | 2/1988 | Kishi et al. | 364/474.25 X |
| 4,727,496 | 2/1988 | Ryouki | 364/474.25 X |
| 4,788,636 | 11/1988 | Shiratori et al. | 364/474.25 X |

Primary Examiner—Joseph Ruggiero
Attorney, Agent, or Firm—Staas & Halsey

[57] ABSTRACT

A figure definition method including the steps of displaying a list (11) of the definition statements of already defined figure elements and graphic images (12) of the already defined figures on a display screen; successively displaying, one at a time in a form distinguishable from others, figure definition statements (11a, 11b, 11c ...) in the list (11), as well as the corresponding graphic images (12a, 12b, 12c ...), whenever a first element selection key (13a) is operated to select a first figure element; then successively displaying, one at a time in a form distinguishable from others, figure definition statements in the list (11), as well as the corresponding graphic images, whenever a second element selection key (13b) is operated, to select a second figure element; and defining another figure element using the selected first and second figure elements.

11 Claims, 6 Drawing Sheets

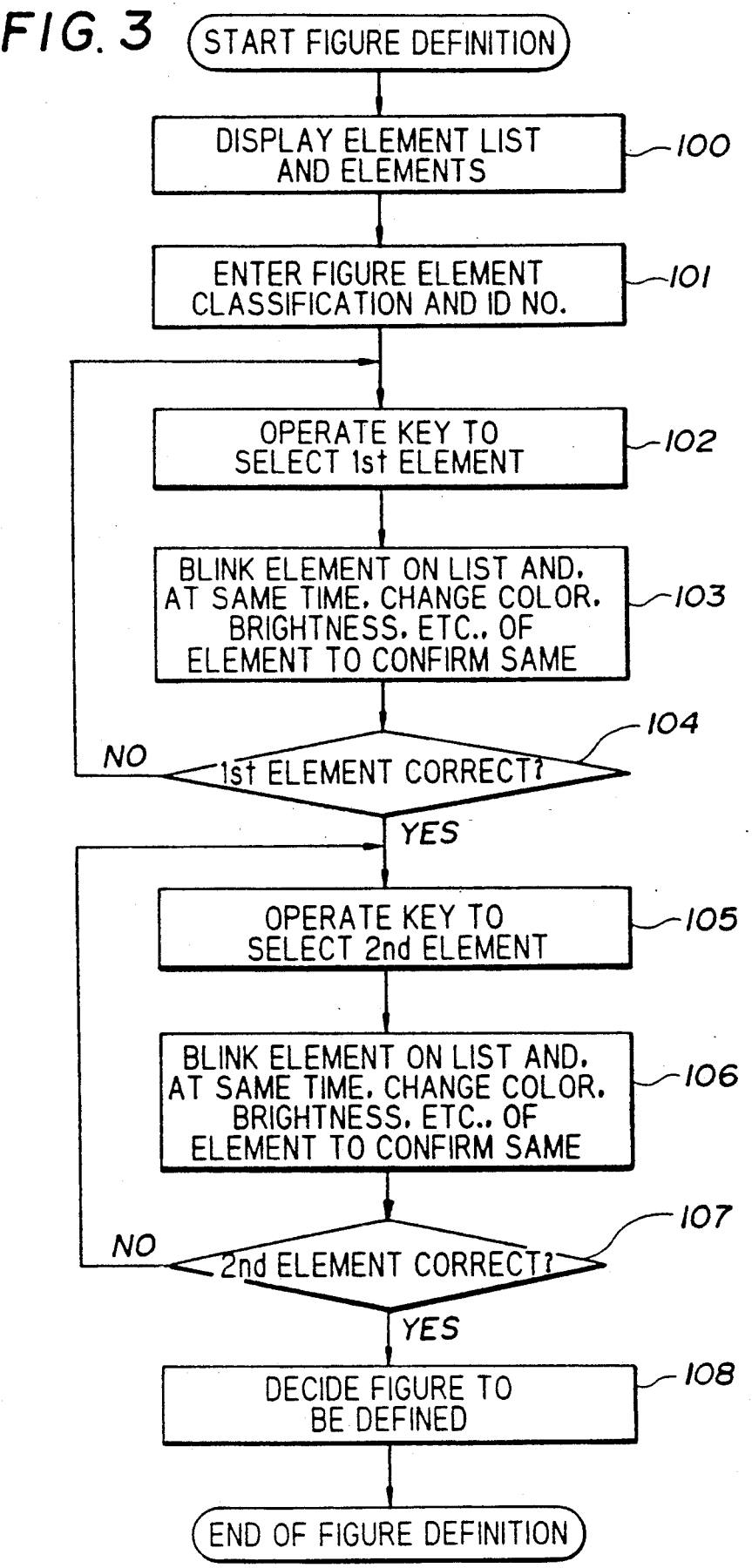

FIGURE DEFINITION METHOD IN AUTOMATIC PROGRAMMING

BACKGROUND OF THE INVENTION

1. Field of the Invention

This invention relates to a figure definition method for use in automatic programming and, more particularly, to a figure definition method in automatic programming for creating an NC machining program automatically from figure definition statements and motion statements created in an automatic programming language.

2. Description of the Related Art

In automatic programming for creating NC data using an automatic programming language such as APT (automatic programming tools) or FAPT, (a) a parts program based on the automatic programming language is created by defining figure elements such as points, straight lines and circular arcs using simple symbols (this is referred to as "figure definition"), and then defining a tool path using the figure elements such as the defined points, straight lines and circular arcs (referred to as "motion statement definition"), and (b) the parts program based on the automatic programming language is subsequently converted into an NC machining program, which comprises NC data (EIA codes or ISO codes) in a format capable of being executed by an NC unit, by using an NC data output table.

In figure definition, conventionally the figure elements are defined by the methods illustrated hereinbelow. Specifically, in defining a point, various methods are available, as follows:

(i) the coordinates of a point may be entered directly from a keyboard in the form $P_i = x_i, y_i$;

(ii) the point can be defined as an intersection between two straight lines $S_m$, $S_n$ [see FIG. 4(a)];

(iii) the point can be defined as either the left or right point of intersection of the two intersections between the straight line $S_m$ and a circle $C_n$ [see FIG. 4(b)];

(iv) the point can be defined as a point of tangency between the straight line $S_m$ and the circle $C_n$ [see FIG. 4(c)];

(v) the point can be defined as either the upper or lower point of intersection of the two intersections between two circles [see FIG. 4(d)]; or (vi) the point can be defined as a point of tangency between two circles [see FIG. 4(e)]. For example, in the cases of (ii), (iii) and (iv), if the following figure definition statements created in the automatic programming language are entered from a keyboard:

$P_i = S_m, S_n$
$P_i = S_m, C_n, L$ (or $R$)
$P_i = S_m, C_n$ (where L: left; R: right), then the coordinates $x_i, y_i$ of the desired intersection or point of tangency are calculated and the point definition data are stored in memory in the form $P_i = x_i, y_i$ Various methods of defining a straight line are also available, as follows:

(i) the straight line can be defined as a straight line $S_i$ passing through one point $P_m$ and forming an angle $\alpha$ with a horizontal axis [See FIG. 5(a)];

(ii) the straight line can be defined as a straight line $S_i$ passing through two points $P_m$, $P_n$ [see FIG. 5(b)];

(iii) the straight line can be defined as a straight line $S_i$ passing through the point $P_m$ and tangent to the circle $C_n$ [see FIG. 5(c)]; or (iv) the straight line can be defined as a straight line $S_i$ tangent to the two circles $C_m$, $C_n$ [see FIG. 5(d)]. For example, in the cases of (i)–(iv), if the following figure definition statements created in the automatic programming language are entered from a keyboard:

$S_i = P_m, \alpha$
$S_i = P_m, P_n$
$S_i = P_m, C_n, A$
$S_i = C_m, C_n, B, A$ (where A: above; B: below), then a distance $L_i$ from the origin (0,0) to the straight line and an angle $A_i$ which the straight line forms with a horizontal line are calculated and the straight-line definition data are stored in memory in the form $S_i = L_i, A_i$ Various methods of defining a circular arc are also available, as follows:

(i) the circular arc can be defined as a circle $C_i$ center $P_m$ and radius r [See FIG. 6(a)];

(ii) the circular arc can be defined as a circle $C_i$ passing through point $P_n$ and having the center $P_m$ [See FIG. 6(b)];

(iii) the circular arc can be defined as a circle $C_i$ tangent to straight line $S_n$ and having the center $P_m$ [See FIG. 6(c)];

(iv) the circular arc can be defined as a circle $C_i$ tangent to circle $C_n$ and having the center $P_m$ [See FIG. 6(d)];

(v) the circular arc can be defined as a circle $C_i$ tangent to straight line $S_n$ and having radius r and center $P_m$ [See FIG. 6(e)];

(vi) the circular arc can be defined as a circle $C_i$ of radius r tangent to the two straight lines $S_m$, $S_n$ [See FIG. 6(f)]; or (vi) the circular arc can be defined as a circle $C_i$ passing through three points $P_m$, $P_n$, $P_s$ [See FIG. 6(g)]. For example, in the cases of (i), (ii) and (iii), if the following figure definition statements created in the automatic programming language are entered from a keyboard:

$C_i = P_m, r$
$C_i = P_m, P_n$
$C_i = P_m, S_n$ then the coordinates $x_m, y_m$ of the center of the center and the radius r thereof are calculated and the circle definition data are stored in memory in the form $C_i = x_m, y_m, r$ Thus, when a new figure element is defined using figure elements already defined, conventionally a code (the element identifier) attached to the already defined figure element must be entered from the keyboard to designate the figure element, and the figure definition statement must be created and entered in a predetermined format.

With this method, however, the operator must memorize the code (element identifier) of the already defined element and must know the grammar (the rules) of the figure definition statement. This makes figure definition troublesome and incapable of being performed in a rapid manner.

Accordingly, an object of the present invention is to provide a figure definition method in the automatic programming in which it is unnecessary to memorize the codes of figure elements (also termed "previously defined figure element definition statements" or "defined figure element definition statements"), and in which figure elements used in defining new figure elements can be confirmed visually through a simple method.

SUMMARY OF THE INVENTION

A figure definition method in automatic programming according to the invention includes displaying a list and graphic images regarding already defined figure elements on a display screen, successively displaying, one at a time in a form distinguishable from others, figure definition statements in the list, as well as the corresponding graphic images, whenever a first element selection key is operated, similarly successively displaying, one at a time in a form distinguishable from others, figure definition statements in the list, as well as the corresponding graphic images, by operating a second element selection key after the first figure element is selected, and defining another figure element using the first and second figure elements. In accordance with this method, it is unnecessary to memorize the codes of figure elements, and figure elements used in defining a new figure element can be verified visually through a simple method.

BRIEF DESCRIPTION OF THE DRAWINGS

FIG. 3 is a flowchart of figure definition processing according to the invention; and FIGS. 4 through 6 are diagrams illustrating the conventional methods of figure definition, in which

DESCRIPTION OF THE PREFERRED EMBODIMENT

Figure 1:
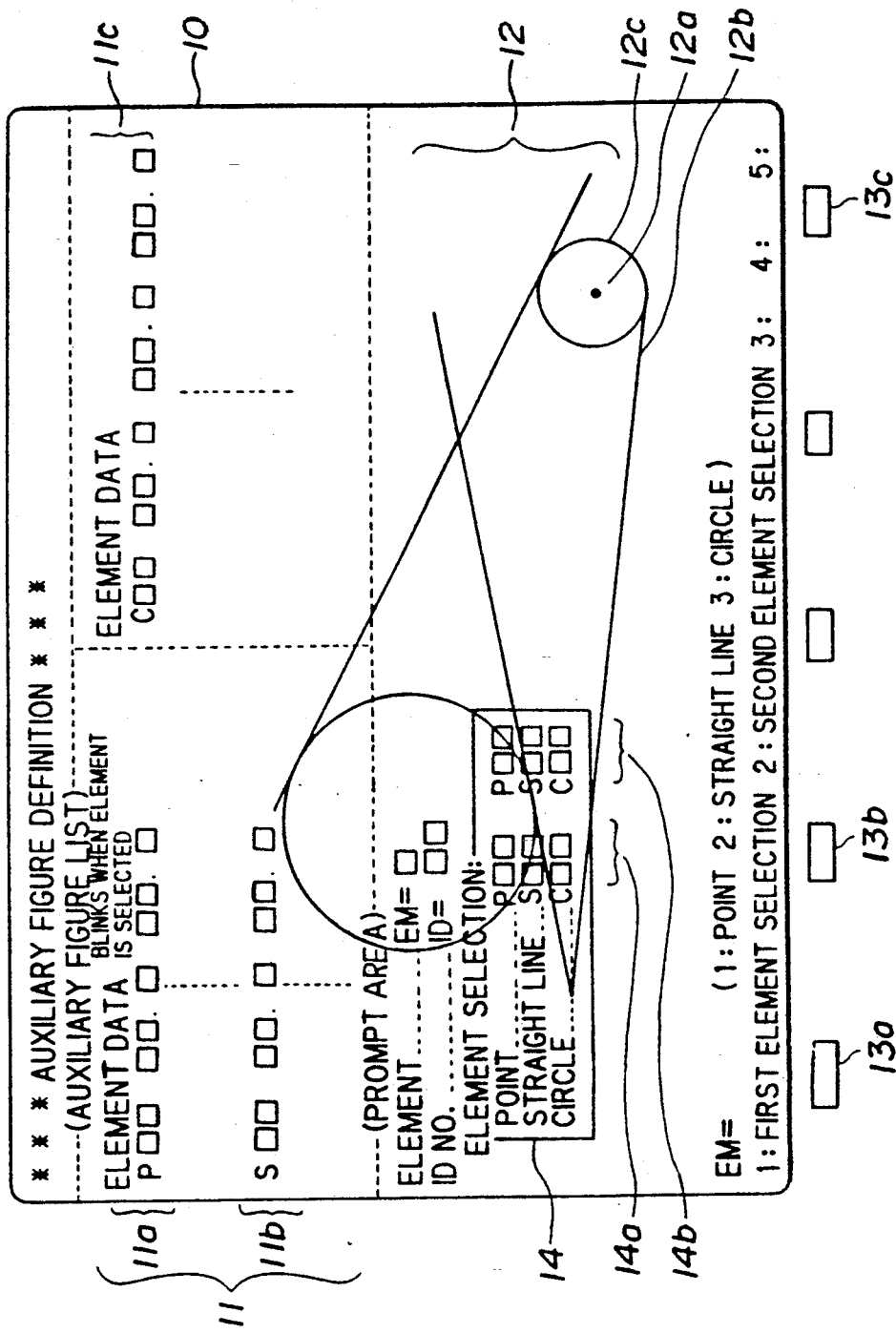
FIG. 1 shows an example of a display screen in the figure definition method of the present invention.

FIG. 1 shows an example of a conversational display screen used the figure definition method of the present invention. Numeral 10 denotes a display screen, 11 denotes a list which includes definition statements 11a, 11b, 11c . . . of already defined figure elements, 12 denotes a graphic image of already defined figures, 13a, 13b denotes first and second element selection keys provided on a keyboard and arranged to correspond to wording "1: FIRST ELEMENT SELECTION" and "2: SECOND ELEMENT SELECTION" appearing on the lowermost line of the display screen 10. Numeral 13c denotes an execute key, and 14 denotes an area displaying identification numbers of elements selected by the first and second element selection keys.

The list 11 of figure definition statements of the already defined figure elements (also termed "previously defined figure element definition statements" or "defined figure element definition statements") and the graphic image 12 of the already defined figures are displayed on the display screen 10. Each time the first figure element selection key 13a is operated, graphic images 12a, 12b, 12c corresponding to the figure definition statements 11a,11b,11c in the list 11 are successively displayed, one at a time, in a form distinguishable from the other images so that this element can be selected.

Thereafter, and in a similar manner, the second element selection key 13b is operated to successively display, one at a time in a form distinguishable from the other images, graphic images corresponding to the figure definition statements in the list 11. Thus, a second figure element is selected. Another figure element is defined using the selected first and second figure elements.

Figure 2:
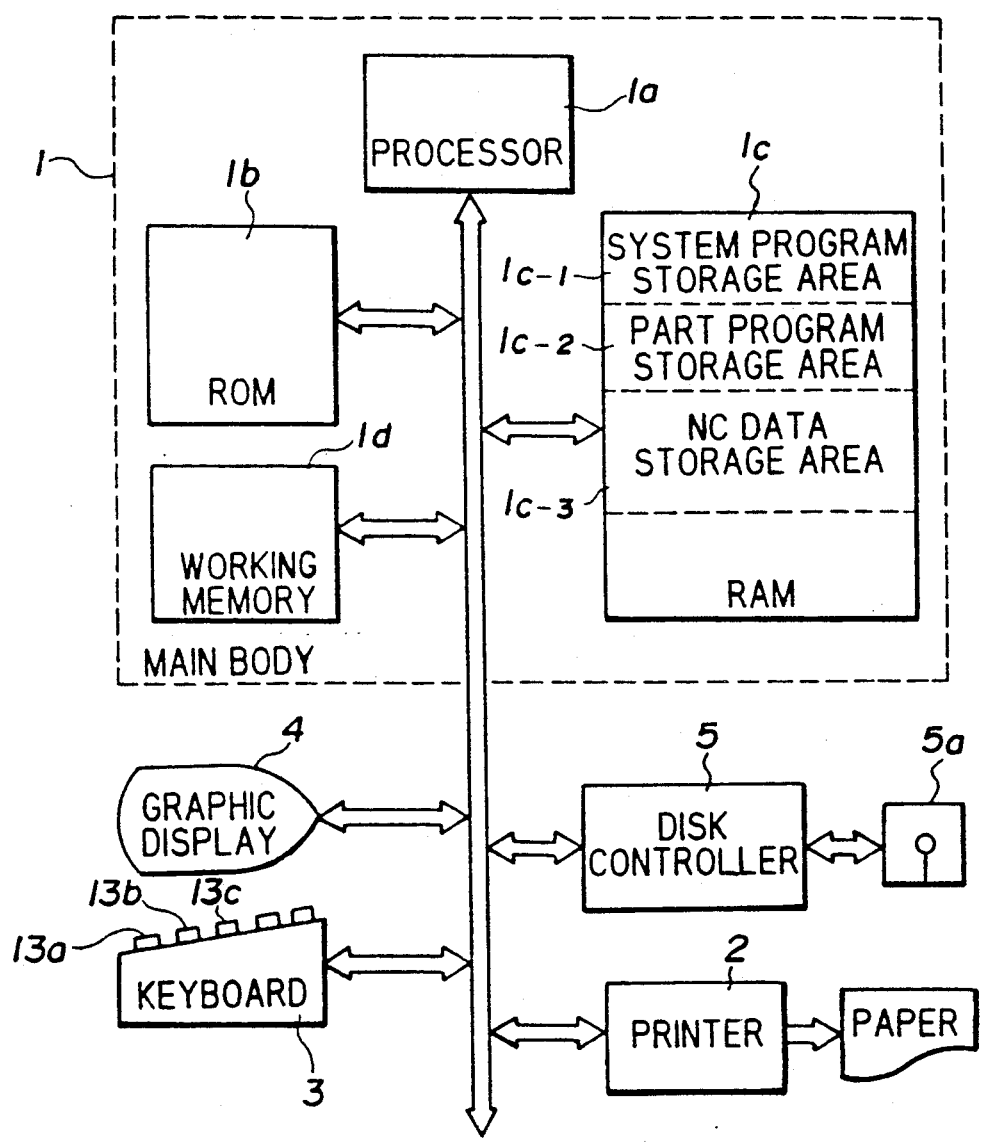
FIG. 2 is a block diagram of an automatic programming system to which the invention can be applied.
Figure 4A:
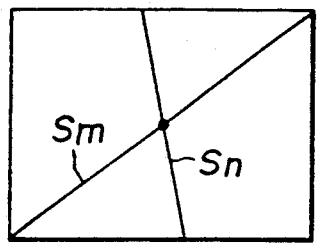
FIGS. 4(a)–4(e) are diagrams for describing a point definition method.
Figure 4B:
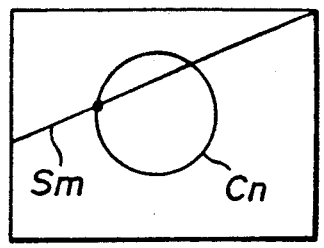
Figure 4C:
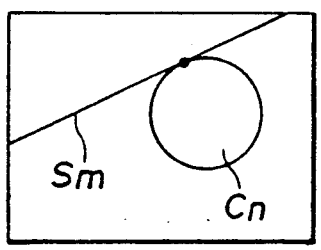
Figure 4D:
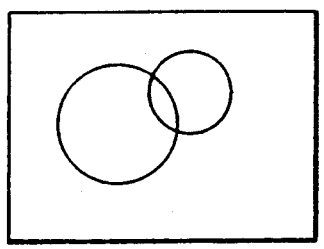
Figure 4E:
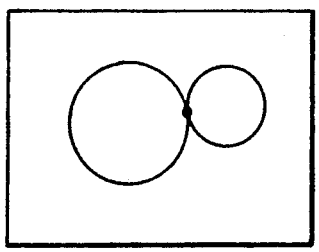
Figure 5A:
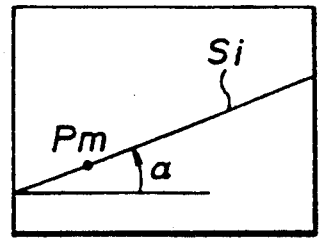
FIGS. 5(a)–5(d) are diagrams for describing a straight-line definition method.
Figure 5B:
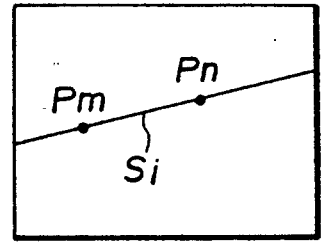
Figure 5C:
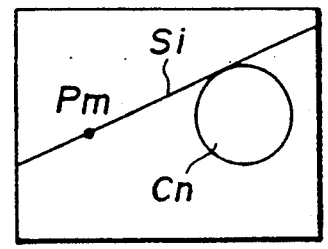
Figure 5D:
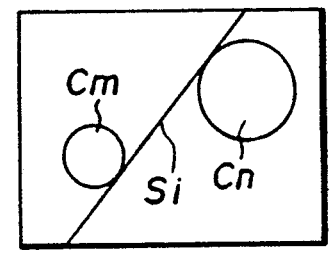
Figure 6A:
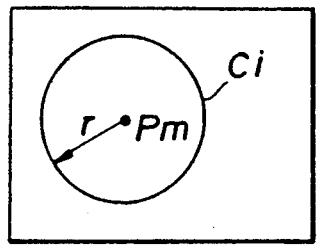
FIGS. 6(a)–6(g) are diagrams for describing a circle definition method.
Figure 6B:
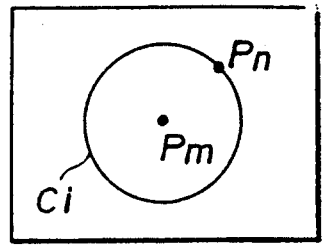
Figure 6C:
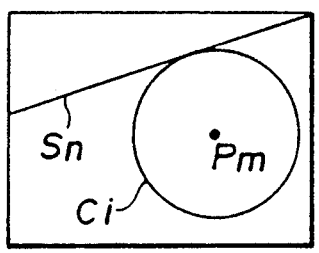
Figure 6D:
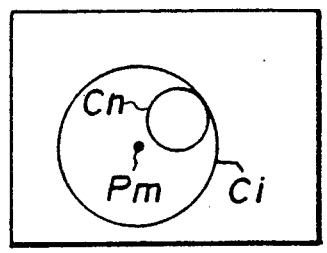
Figure 6E:
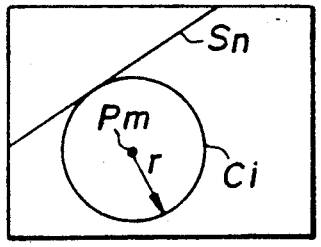
Figure 6F:
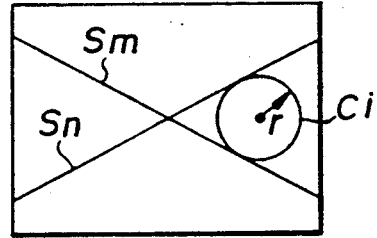
Figure 6G:
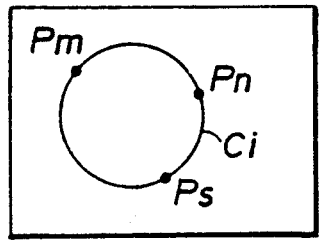

FIG. 2 is a block diagram of an automatic programming apparatus to which the method of the invention can be applied. In FIG. 2, numeral 1 denotes the main body of an automatic programming apparatus, 1a denotes a processor, 1b denotes a ROM storing a loading program, 1c denotes a RAM, and 1d denotes a working memory. The RAM 1c is provided with a system program storage area 1c-1 storing a system program and the like read from, for example, a floppydisk, a part program storage area 1c-2 for storing a part program PTP in the automatic programming language, and an NC data storage area 1c-3 for storing NC data (an NC machining program). Numeral 2 denotes a printer, 3 denotes a keyboard, 4 denotes a graphic display unit, 5 denotes a disk controller and 5a denotes a floppy.

Various keys are provided on the keyboard 3. The keyboard 3 is provided with the first element selection key 13a for selecting a first figure element, the second element selection key 13b for selecting a second figure element, and an execute key 13c, these being employed when a new figure element is defined using the first and second already defined figure elements.

FIG. 3 is a flowchart of processing according to the present invention. The figure definition method of the invention will now be described in accordance with FIGS. 1 through 3.

The processor 1a causes the list 11, which includes the figure definition statements 11a, 11b, 11c, . . . of defined points, straight lines and circles, etc., to be displayed in the area at the upper part of the display screen 10 for conversationally defining figures (see FIG. 1). The processor 1a causes the graphic images 12a, 12b, 12c, . . . of the figure elements to be displayed in a form superimposed on list 11 (step 100). The figure definition statement of a point is displayed in the form $$P \Box\Box X_i Y_i \qquad (1)$$

by the point identifier (the alphabetic character P and a two-digit identification number) and the coordinates $X_i$, $Y_i$ of the point. The figure definition statement of a straight line is displayed in the form $$S \Box\Box L_i A_i \qquad (2)$$

by the straight-line identifier (the alphabetic character S and a two-digit identification number), distance $L_i$ from the origin and an angle $A_i$ defined by the straight line and the horizontal axis. The figure definition statement of a circle is displayed in the form $$C \; \Box \Box X_i \, Y_i \, R_i \tag{3}$$

by the circle identifier (the alphabetic character C and a two-digit identification number), the coordinates $X_i, Y_i$ of the center of the circle, and the radius $R_i$ of the circular arc.

When a new figure element is to be defined using already defined figure elements under these conditions, first the classification (point, straight line or circle) of the figure element to be defined is entered in the form of a numerical value 1, 2 or 3 in accordance with a prompt for the figure element (EM) which appears in a prompt area (see FIG. 1) at the lower part of the display screen, and the identification number (ID) of this figure element is entered (step 101).

Thereafter, the first element selection key 13a is pressed to select the first figure element (step 102).

Each time the first figure element selection key 13a is pressed, the processor 1a causes the figure definition statements (11a, 11b, 11c, etc.) in the list 11 to be displayed, one after another starting from the first statement, in a form distinguishable from the other figure definition statements (as by making the statement blink), and causes the corresponding graphic images (12a, 12b, 12c, etc.) to be displayed, one after another starting from the first image, in a form distinguishable from the other graphic images, as by altering the color or the brightness of the image (step 103). It should be noted that the identification number of the figure element selected and presently made to blink by the first element selection key 13a in the area 14a on the left side of the "FIGURE SELECTION AREA" 14 on display screen 10 in FIG. 1 is displayed so as to follow the alphabetic character P, S or C.

The foregoing operation and display processing are carried out until the first figure element is selected. When the desired figure element is displayed in a distinguishable form and selected (steps 102-104), the second element selection key 13b is operated next in order to select the second figure element (step 105).

Whenever the second element selection key 13b is pressed, the processor 1a similarly causes the figure definition statements (11a, 11b, 11c, etc.) in the list 11 to be displayed, one after another starting from the first statement, in blinking form, and causes the corresponding graphic images to be displayed, one after another starting from the first image, in a different color or brightness, by way of example (step 106). It should be noted that the identification number of the figure element selected and presently made to blink by the second element selection key 13b in the area 14b on the right side of the "FIGURE SELECTION AREA" 14 on display screen 10 in FIG. 1 is displayed so as to follow the alphabetic character P, S or C.

The foregoing operation and display processing are carried out until the second figure element is displayed (selected) in distinguishable form (steps 105-107). The execute key (input key) 13c, by way of example, is operated after the second figure element is selected.

Thus, if the new figure element defined by the first and second figure elements is a point, the processor 1a computes the coordinates $(X_i, Y_i)$ of the point using the first and second figure elements, causes the point definition statement having the format shown at (1) to be displayed supplementarily at the end of list 11 and causes the graphic image of the point to be displayed. If the new figure element defined by the first and second figure elements is a straight line, the processor uses the first and second figure elements to compute the distance $L_i$ from the origin to the straight line and the angle $A_i$ defined by the straight line and the horizontal axis, causes the straight-line definition statement having the format shown at (2) to be displayed supplementarily at the end of list 11 and causes the graphic image of the straight line to be displayed. If the new figure element defined by the first and second figure elements is a circle, the processor 1a uses the first and second figure elements to compute the coordinates $(X_i, Y_i)$ of the center of the circle and the radius $R_i$ thereof, causes the circle definition statement having the format shown at (3) to be displayed supplementarily at the end of list 11 and causes the graphic image of the circle to be displayed (step 108).

Processing for defining another figure element using already defined figure elements is thus terminated.

In a case where two or more points, two or more straight lines or two or more circles are specified by first and second figure elements, the processor 1a changes over the conversational screen when the execute key 13c is pressed, causes the first and second figure elements and the two or more points, two or more straight lines or two or more circles specified by the first and second figure elements to be displayed, and inquires as to which one is to be defined as a new figure element. Thus, if a figure element to be newly defined is designated by right (R), left (L), above (A) or below (B), for example, then the display screen will return to that shown in FIG. 1, the processing of step 108 will thenceforth be executed and definition of the figure element will end.

Thus, in accordance with the present invention, it is arranged to display a list and graphic images regarding already defined figure elements on a display screen, successively display, one at a time in a form distinguishable from others, figure definition statements in the list, as well as the corresponding graphic images, whenever a first element selection key is operated, thereby to select a first figure element, similarly select a second figure element by operating a second element selection key, and define another figure element using the first and second figure elements. Accordingly, it is unnecessary to memorize the codes of figure elements that have already been defined, and already defined figure elements used in defining a new figure element can be verified visually through a simple method. This makes correct figure definition possible.

What is claimed is:

1. A figure definition method in automatic programming for creating an NC part program based on an automatic programming language, by using at least two previously defined figure elements to define a new figure element and specifying a tool path using identification codes assigned to the defined figure elements, said method comprising the steps of:
   (a) displaying a list of figure definition statements and graphic images regarding the previously defined figure elements on a display screen;
   (b) successively displaying on the display screen, one at a time in a form distinguishable from others, the figure definition statements in the list and the graphic images corresponding thereto, whenever a first element selection key is operated to select a first figure element of the previously defined figure elements;

(c) successively displaying, one at a time in a form distinguishable from others, the list of figure definition statements and the graphic images corresponding thereto, to select a second figure element by operating a second element selection key after the first figure element is selected in step (b); and (d) defining the new figure element automatically based on the first and second figure elements.

2. A figure definition method in automatic programming according to claim 1, wherein said method further comprises the steps of:

(e) entering classification type and an identification code indicating whether the new figure element defined by the first and second figure elements is a point straight line or circle;

(f) generating the new figure element of the classification type entered in step (e) using the first and second figure elements; and (g) assigning the identification code to the figure element generated in step (f).

3. A figure definition method in automatic programming according to claim 2, wherein when a plurality of new figure elements are obtained by the first and second figure elements in step (d), said method further comprises the steps of:

(h) displaying the first and second figure elements and the plurality of new figure elements on the display screen; and (i) selecting one of the plurality of new figure elements as a desired figure element.

4. A figure definition method in automatic programming according to claim 3, wherein said selecting in step (i) of the desired figure element is performed by designating "right" when the desired figure element among the plurality of figure elements is a figure element on a right side, designating "left" when the desired figure element is a figure element on a left side, designating "above" when the desired figure element is a figure element on an upper side, and designating "below" when the desired figure element is a figure element on a lower side.

5. A method for producing a figure element definition statement of a figure element used to create a numerical control program based on an automatic programming language, said method comprising the steps of:

(a) displaying a plurality of previously defined figure element definition statements along with graphic images corresponding to a plurality of previously defined figure elements;

(b) receiving a classification type and an identification code for a new figure element to be defined;

(c) selecting a first figure element of the previously defined figure elements by sequentially displaying the defined figure element definition statement and the graphic image of each of the previously defined figure elements in a manner distinguishable from other previously defined figure elements to indicate its selection;

(d) selecting a second figure element of the previously defined figure elements by sequentially displaying the defined figure element definition statement and the graphic image of each of the previously defined figure elements in a manner distinguishable from other previously defined figure elements to indicate its selection; and (e) producing the new figure element in accordance with the classification type, the second figure element and the second figure element.

6. A method as recited in claim 5,
wherein step (e) includes the substep of (e1) producing a figure element definition statement and a graphic image for the new figure element, and
wherein said method further comprises the step of (f) displaying the figure element definition statement along with the graphic image corresponding to the new figure element.

7. A method as recited in claim 5, wherein said method is performed by an automatic programming apparatus having a display screen, a first selection key and a second selection key,
wherein said displaying in step (a) and the distinguishably displaying in steps (c) and (d) occurs on the display screen, and
wherein said selecting in step (c) is performed by the first selection key, and the selecting in step (d) by the second selection key.

8. A method as recited in claim 5,
wherein step (c) includes the substep (c1) displaying the identification code of the first figure element after the first figure element is selected, and
wherein step (d) includes the substep (d1) displaying the identification code of the second figure element after the second figure element is selected.

9. A method as recites in claim 5, wherein said method further comprises the step (f) repeating steps (a) through (e) with the new figure element as one of the plurality of previously defined figure elements.

10. An automatic control system for producing a figure element definition statement of a figure element used to create a numerical control program based on an automatic programming language, comprising:

display means for displaying a plurality of previously defined figure element definition statements along with graphic images corresponding to a plurality of previously defined figure elements;

input means for inputting a classification type and an identification code for a new figure element to be defined, a first selection signal, and a second selection signal; and control means for controlling selection of a first figure element and a second figure element, and for producing the new figure, said control means including first selection means for selecting the first figure element from the previously defined figure elements by sequencing through the previously defined figure elements in accordance with the first selection signal;

second selection means for selecting the second figure element from the previously defined figure elements by sequencing through the previously defined figure elements in accordance with the second selection signal; and computation means for producing the new figure element in accordance with the classification type, the second figure element and the second figure element.

11. A system as recited in claim 10,
wherein said first selection means sequentially displays the defined figure element statement and the graphic image of each of the previously defined figure elements in a manner distinguishable from other previously defined figure elements to indicate its selection, and wherein said second selection means sequentially displays the defined figure element statement and the graphic image of each of the previously defined figure elements in a manner distinguishable from other previously defined figure elements to indicate its selection.

* * * * *